US006770718B2

(12) United States Patent
Covezzi et al.

(10) Patent No.: US 6,770,718 B2
(45) Date of Patent: Aug. 3, 2004

(54) CONTINUOUS PROCESS FOR THE PREPARATION OF SOLID CATALYST COMPONENTS FOR THE POLYMERIZATION OF α-OLEFINS

(75) Inventors: Massimo Covezzi, Ferrara (IT); Anna Fait, Ferrara (IT); Almerinda Di Benedetto, Naples (IT)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 10/181,336

(22) PCT Filed: Dec. 10, 2001

(86) PCT No.: PCT/EP01/14642

§ 371 (c)(1),
(2), (4) Date: Jul. 17, 2002

(87) PCT Pub. No.: WO02/48208

PCT Pub. Date: Jun. 20, 2002

(65) Prior Publication Data

US 2003/0036611 A1 Feb. 20, 2003

(30) Foreign Application Priority Data

Dec. 15, 2000 (EP) ............................................ 00204541

(51) Int. Cl.[7] .................................................. C08F 4/44
(52) U.S. Cl. ................. 526/123.1; 526/348; 526/124.1; 526/142; 502/103; 502/115; 502/125
(58) Field of Search .............................. 526/348, 123.1, 526/124.1, 142; 502/103, 115, 125

(56) References Cited

U.S. PATENT DOCUMENTS

| 4,076,924 A | * | 2/1978 | Toyota et al. ................ 526/125 |
| 4,328,328 A |   | 5/1982 | Minami et al. ............. 526/125 |
| 5,106,805 A | * | 4/1992 | Bailly et al. ................. 502/111 |

FOREIGN PATENT DOCUMENTS

| AU | 6241886 | 3/1987 |
| EP | 0106141 | 4/1984 |
| EP | 0370372 | 5/1990 |
| EP | 0728769 | 8/1996 |
| IT | 1188169 | 1/1988 |

OTHER PUBLICATIONS

G. F. Froment and K. B.Bishoff; "The Perfectly Mixed Flow Reactor," *Chemical Reactor Analysis and Design*, Chapter 10, pp. 420–421 (1979).

* cited by examiner

Primary Examiner—Ling-Siu Choi

(57) ABSTRACT

A process is provided for the preparation of a solid catalyst component for the polymerization of olefins, comprising continuously feeding a liquid containing a titanium compound having at least one titanium-halogen bond into a vessel containing a solid comprising a magnesium halide and continuously discharging liquid from the vessel, whereby the concentration of the solid is maintained within the range of between 80 and 300 g/l, and the product between the average residence time of the liquid in the vessel and the concentration of the solid is maintained below 10,000 min*g/l. An advantage of the process is the reduced time and reactor volume necessary to prepare the catalysts, which show good activity and stereospecificity.

20 Claims, No Drawings

CONTINUOUS PROCESS FOR THE PREPARATION OF SOLID CATALYST COMPONENTS FOR THE POLYMERIZATION OF α-OLEFINS

This application is the U.S. national phase of International Application PCT/EP01/14642filed Dec. 10, 2001.

The present invention relates to a process for preparing a solid component of a high-yield catalyst for the polymerisation of α-olefins.

High yield heterogeneous supported catalysts for olefin polymerisation can be obtained, for example, by contacting:
a solid catalytic component obtained by contacting a titanium compound comprising at least a titanium-halogen bond with a solid support comprising a magnesium halide or a compound capable of reacting with the above said titanium compound to yield a magnesium halide;
an aluminium organometallic compound; and optionally an electron donor compound (external donor).

The above mentioned reaction can be carried out in the presence of another electron donor compound (internal donor). This is necessary when a catalyst is produced for the stereospecific polymerisation of propylene or higher α-olefins.

Useful solid catalytic components are obtained by reacting $TiCl_4$ with a support consisting of a magnesium compound that can be a magnesium dihalide, such as $MgCl_2$, or an alcoholate or haloalcoholates of magnesium, such as ethoxymagnesiumchloride or diethoxymagnesium. Particularly preferred supports consist of adducts of $MgCl_2$ with aliphatic alcohols, such as ethanol, in the form of spherical particles.

It is known that the preparation of such solid catalytic components is carried out in a batch reactor. The use of a batch reactor gives problems due to the formation of by-products deriving from the reaction of the titanium compound with the magnesium compound and with the electron donor compound, if present. This fact limits the solids concentration (with respect to the liquid titanium compound) that can be used in the contacting step and requires many washing steps of the obtained component. Consequently, the preparation of solid catalytic components in a batch reactor requires long residence times, large reactor volumes and large amounts of liquid titanium compound, thus raising the production costs. Furthermore, the presence of sensible concentrations of the said by-products affects the catalyst activity and its stereospecificity, when propylene or higher α-olefins are polymerised.

With the aim of simplifying the preparation of such catalyst components, Italian patent No. 1,188,169 suggests percolating a liquid comprising a halogenated titanium compound through a solid support consisting of a magnesium halide in active form. However, inasmuch as the percolation consists of the gravity flow of a liquid through the pore spaces and interstices of solid particles, the composition of the percolating liquid varies while flowing through the solid and the concentration of the system is far from being uniform. Moreover, the percolation process described in this Italian patent does not allow obtaining a catalyst endowed with a satisfactory activity.

It has now been found that by carrying out the preparation of the above catalyst component in a continues way and by selecting properly the operative conditions in the step of titanation, the drawbacks due to the presence of by-products are minimised and the productivity of the process itself is increased. Furthermore, the final catalysts are endowed with good performances as to activity and stereospecificity.

It is therefore an object of the present invention a process for preparing a solid catalyst component for the polymerisation of olefins, said process comprising the steps of:

continuously feeding a liquid containing a titanium compound having at least one titanium-halogen bond into a vessel containing a suspension of a solid comprising a magnesium halide, and
continuously discharging liquid from the vessel,
wherein the suspension is maintained under adequate stirring so as to obtain substantial uniformity of concentration throughout the vessel.

In the process of the present invention, the concentration of the solid is maintained within the range of between 80 and 300 g/l, preferably between 100 and 250 g/l, and the product between the average residence time of the liquid in the vessel and the concentration of the solid is maintained below 10,000 min*g/l, preferably below 5,000 min*g/l.

In order to maintain said product at a value below 10,000 min*g/l, the average residence time of the liquid in the vessel is preferably below 60 min, more preferably below 50 min, and it can be advantageously kept even under 30 min.

As oppose to the small mixing of the liquid that flows under the gravity action in a plug flow mode in the percolation, the technique adopted in the process of the present invention makes it possible to achieve an intimate mixing of the contents of the reactor. The resulting uniformity of concentration, and also of temperature, throughout the reactor accounts for the better effectiveness and efficiency of the process. The present reactor approaches the ideal mixing pattern described by G. F. Froment and K. B. Bishoff in Chapter 10 of "Chemical Reactor Analysis and Design" John Whiley & Sons (1979).

To continuously withdraw liquid from the vessel, the liquid needs to be separated from the solids in the slurry. This can be achieved by means of appropriate separating techniques, particularly by filtration or centrifugation. Suitable separating elements are filters that are generally placed inside the vessel but can also be placed outside of the vessel. Alternatively, a centrifuge or a hydrocyclone can be employed.

An electron donor compound (internal donor) may be added to the support before or during the contacting with the titanium compound. It can also be added along with the liquid containing the said titanium compound.

A preferred titanium compound is $TiCl_4$.

The solid comprising the magnesium halide may be advantageously suspended in a liquid which can be a titanium compound, an organic compound or a mixture thereof.

Alternatively, a magnesium compound capable to yield a solid magnesium halide by reaction with the said titanium compound can be introduced into the vessel and reacted with the said titanium compound.

Preferred magnesium compounds are magnesium halides, such as $MgCl_2$, or compounds capable to yield $MgCl_2$ by reaction with the titanium compound. Particularly preferred magnesium compounds are magnesium adducts with an aliphatic alcohol, preferably ethanol. It is preferred that the magnesium halide is in its active form and that the magnesium compound is capable to yield a magnesium halide in its active form when reacted with the Ti compound. As it is well known in the field of Ziegler-Natta catalysts, "magnesium chloride in active form" means magnesium chloride characterised by X-ray spectra in which the most intense diffraction line that appears in the spectrum of the non-active halide is diminished in intensity and is replaced by a halo whose maximum intensity is displaced towards lower angles relative to that of the more intense line. Particularly preferred magnesium compounds are spheriform adducts $MgCl_2$/ethanol with average diameter in the range of between 0.1 and 150 μm, more preferably of between 1 and 100 μm.

Electron donor compounds suitable for the preparation of the solid catalyst component can be selected from ethers, esters, ketones, amides and tertiary amines. One class of preferred electron donors is the mono- or di-alkyl esters of aromatic carboxylic acids, such as diisobutylphthalate or ethylbenzoate.

It is preferred that the liquid fed to the vessel during the contacting treatment contains, at least from a certain time on, a liquid organic substance having dielectric constant at 20° C. equal to or higher then 2 such as those described in EP-106,141. Preferred liquid organic substances are aromatic hydrocarbons or aromatic halohydrocarbons. The use of aromatic halohydrocarbons, such as chlorinated aromatic hydrocarbons, may lead to superior activities. In the class of non-halogenated hydrocarbons, toluene and ethylbenzene are particularly preferred. A suitable composition for the liquid phase fed to the vessel is an equimolecular mixture of the titanium compound and of an aromatic hydrocarbon.

The initial contacting temperature of the liquid comprising a titanium compound with the solid support is generally in the range of between 0 and 50° C. Such a temperature is then gradually raised to the value to be kept in the range from 40° C. to 200° C., preferably from 80° C. to 135° C.

The feeding of the electron donor compound is preferably carried out when the temperature of the vessel ranges from 0° C. to 80° C., more preferably from 20° C. to 60° C.

As an example, a typical scheme for preparing a catalyst component for the stereospecific polymerisation of propylene according to the process of the invention is given below.

a vessel is loaded with $TiCl_4$ at a temperature of 0° C.;

then the solid support ($MgC_2$*nEtOH, where n is from 0.1 to 6) is loaded;

the temperature is then gradually raised to 40° C.;

next the electron donor (for example diisobutylphthalate) is fed;

thereafter $TiCl_4$ is continuously fed and the liquid phase continuously withdrawn to keep the solids concentration at 200 g/l, the average residence time of the liquid being 15 minutes, while the temperature is gradually raised to 120° C.;

when the temperature of 120° C. is reached, the composition of the liquid being continuously fed is changed to a mixture of a liquid aromatic hydrocarbon and $TiCl_4$ in equal parts by volume, the average residence time of the liquid being 15 minutes and the solids concentration and the temperature being kept constant for 1 hour;

after that time the liquid feeding is discontinued and the liquid phase is removed;

finally the solid is washed with toluene at 100° C. and then 5 times with hexane at 60° C.

An alternative way to proceed is to load the vessel with $TiCl_4$ at 10° C., then introduce the solid support and the electron donor, keep for 1 hour at 10° C. and then the continuous feeding of the $TiCl_4$ is started and the process is conducted as above.

According to a preferred embodiment, the process can be carried out as follows:

a vessel is loaded with an organic solvent (for example heptane or toluene) at 10° C.;

then the solid support ($MgCl_2$*nEtOH, where n is from 0.1 to 6) is loaded.

thereafter $TiCl_4$ is continuously fed and the liquid phase continuously withdrawn to keep the solids concentration between 100 and 200 g/l, the average residence time of the liquid being below 50 minutes, while the temperature is kept at 10° C.;

subsequently the electron donor is introduced in about 10–30 minutes;

after 1 hour the temperature is raised to about 110° C. and kept for another hour, while the $TiCl_4$ continues to be fed;

after that time the liquid feeding is discontinued and the liquid phase is removed;

finally the solid is washed with toluene at 100° C. and then 5 times with hexane at 60° C.

It has been found that catalysts obtained with the latter procedure are generally capable to yield polymers endowed with greater porosity.

The catalyst components produced by the process of the present invention are generally used after contacting them with an aluminium compound such as an aluminium-trialkyl or an aluminium-alkyl-hydride. A commonly used compound is triethyl-aluminium.

Particularly when stereospecific polymers are produced, an electron donor (external donor) is contacted with the solid catalyst component before the polymerisation. The external donor compound may be the same or different from the internal donor. Preferred compounds are silicon compounds containing at least one Si—OR bond (R being a hydrocarbon radical).

The catalysts obtainable from the solid catalyst components prepared with the process of the present invention are particularly suitable to homo- or co-polymerise α-olefins of formula $CH_2$—CHR, wherein R is hydrogen or an alkyl, cycloalkyl, aryl, arylalkyl or alkylaryl radical with 1 to 12 carbon atoms. A preferred field of application is the production of stereospecific (co)polymers of propylene.

The following examples will further illustrate the present invention without limiting its scope.

Characterisations

Isotactic index: insolubility in xylene at 25° C.

Bulk density: DIN-53794.

Porosity: determined by immersing a known quantity of the sample in a known quantity of mercury inside a dilatometer and then gradually increasing the mercury pressure hydraulically. The pressure of introduction of the mercury into the pores is function of the pore diameter. Measurements were effected using a "Porosimeter 2000 series" from Carlo Erba. The porosity, pore distribution and surface area were calculated from the data of decrease of the volume of mercury and from the values of the applied pressure.

Preparation of the Solid Support

A solid support consisting of a $MgCl_2$*2.1$C_2H_5OH$ adduct was prepared following the procedure described in Example 1 of EP A 728 769, from page 12, line 55 to page 13, line 13.

Preparation of the Solid Catalytic Component

EXAMPLE 1

1000 ml of $TiCl_4$ were loaded into a jacketed 1.7 l glass reactor provided with a mechanical stirrer and a filter.

The internal temperature was brought to 0° C., by recirculating a refrigerating liquid in the jacket of the reactor. Then, 200 g of solid support were loaded into the reactor kept under nitrogen flux. The solid was suspended by operating the stirrer at an adequate speed to obtain a homogeneous suspension and to minimize resistance to the transfer of material and heat. The internal temperature was then brought to 40° C. in 80 min at a constant rate of temperature change. During this operation HCl evolved and was removed by the nitrogen flux.

When the temperature was reached, 40 g of diisobutylphthalate (DIBP) were fed to the reactor by a metering pump in 12 min while stirring of the reactor contents was continued.

After the introduction of diisobutylphthalate was terminated, $TiCl_4$ was fed at a rate of 4 l/h and the liquid was continuously withdrawn from the reactor to keep constant the initial volume of the suspension. The stream entering the reactor was pre-heated to improve the control of the internal temperature. The withdrawn liquid was filtered to retain the solid in the reactor. From the start of the $TiCl_4$ feeding, the temperature was incrementally increased at a rate of 1.5° C./min. When the temperature of 115° C. was reached, the composition of the stream entering the reactor was changed by feeding 4 l/h of a mixture 1:1 by volume of $TiCl_4$ and toluene for 1 hour while maintaining the temperature at 115° C. Thereafter, the stirring was interrupted and the solid was allowed to settle. The liquid was removed by siphoning and the solid was subjected to six batch washings, the first of which was carried out in toluene (1l) at 90° C. for 5 min under stirring and the following five in hexane (1l) at 60° C., each for 5 min under stirring. solid was subjected to six batch washings, the first of which carried out in toluene (1l) at 90° C.

The catalyst was discharged as a hexane suspension and dried under vacuum at 40° C. for 90 min.

The composition of the product obtained is given in Table 1.

EXAMPLE 2

The example was carried out in the same way of Example 1, except that 1 l/h instead of 4 l/h of $TiCl_4$ were fed.

EXAMPLE 3

The example was carried out in the same way of Example 1, except that, during the feeding of a stream of $TiCl_4$ to the reactor, the temperature is raised to 120° C. at the same temperature increase rate and, thereafter, a 1:1 by mol mixture of $TiCl_4$ and ethylbenzene is fed at a flow rate of 4 l/h for 40 min, while maintaining the temperature at 120° C. (instead of the mixture $TiCl_4$/toluene).

The washings were carried out as in Example 1, except that the first of the six washings was carried out with ethylbenzene instead of toluene.

The composition of the product obtained is given in Table 1.

EXAMPLE 4

The example was carried out in the same way of Example 1, except that 100 g of solid support are loaded instead of 200, 12 g of DIBP instead of 40, during the feeding of the stream of $TiCl_4$ to the reactor, the temperature was raised to 120° C. at the same temperature increase rate and maintained at 120° C. for 1 hour and 1.5 instead of 4 l/h of $TiCl_4$ were fed. The first of the six washings of Example 1 was omitted.

The composition of the product obtained is given in Table 1.

EXAMPLE 5

The operations were carried out as in example 1, except that after adding the diisobutylphthalate and before feeding the stream of $TiCl_4$, the temperature was incrementally increased at a rate of 1.5° C./min to reach the temperature of 110° C. During the feed of the stream of TiCl4, the temperature was further raised to 120° C. at the same increase rate.

When the temperature of 120° C. was reached, the composition of the stream entering the reactor was changed by feeding 4 l/h of a mixture 1:1 by volume of $TiCl_4$ and toluene for 1 hour while maintaining the temperature constant. The washing steps were then carried out as in example 1.

The composition of the product obtained is given in Table 1.

EXAMPLE 6

1600 ml of toluene were loaded into a jacketed 2.0l glass reactor provided with a mechanical stirrer and a filter. The internal temperature was brought to 10° C. by recirculating a refrigerating liquid in the jacket of the reactor. Then 165 g of solid support were loaded into the reactor kept under nitrogen flux. The solid was suspended by operating the stirrer at an adequate speed to obtain a homogeneous suspension and to minimize resistance to the transfer of material and heat.

$TiCl_4$ was then fed by means of a metering pump at a rate of 2 l/h and the liquid was continuously withdrawn from the reactor to keep the initial volume of the suspension constant. The stream entering the reactor was pre-heated to improve the control of the internal temperature. After 1 hour at 10° C., 20g of diisobutylphthalate were introduced by another metering pump in 10 min. After another hour at a constant temperature of 10° C., the temperature was raised to 170° C. in 180 min at a constant increase rate. The liquid withdrawn was filtered to retain the solid in the reactor. The temperature was kept at 107° C. for an additional 20 min.

Thereafter, the stirring was interrupted and the solid was allowed to settle. The liquid was removed by siphoning and the solid was subjected to eight batch washings, the first three of which carried out in toluene (1.5 l) at 90° C., each for 5 min under stirring, and the following five in hexane (1.5 l) at 60° C., each for 5 min under stirring.

The catalyst was discharged as a hexane suspension and dried under vacuum at 40° C. for 90 min.

The composition of the product obtained is given in Table 1.

EXAMPLE 7

1600 ml of heptane were loaded into a jacketed 2000 ml glass reactor, provided with a mechanical stirrer, and a filter.

The internal temperature was brought to 10° C. by recirculating a refrigerating liquid in the jacket of the reactor. Then, 160 g of solid support were loaded into the reactor kept under nitrogen flux. The solid was suspended by operating the stiffer at an adequate speed to obtain a homogeneous suspension and to minimize resistance to the transfer of material and heat.

TiCl4 was then fed by means of a metering pump at a rate of 2 l/h and the liquid was continuously withdrawn from the reactor to keep constant the initial volume of the suspension. The stream entering the reactor was pre-heated to improve the control of the internal temperature. After 1 hour at 10° C., 20g of diisobutylphthalate were introduced by another metering pump in 28 min. After another hour at a constant temperature of 10° C., the temperature was raised to 115° C. in 140 min at a constant increase rate. The withdrawn liquid was filtered to retain the solid in the reactor. The temperature was kept at 107° C. for an additional 50 min.

Thereafter, the stirring was interrupted and the solid was allowed to settle. The liquid was removed by siphoning and the solid was subjected to six batch washings, the first of which carried out in toluene (1.5 l) at 90° C. for 5 min under stirring and the following five in hexane (1.5 l) at 60° C., each for 5 min under stirring.

The catalyst was discharged as a hexane suspension and dried under vacuum at 40° C. for 90 min.

The composition of the product obtained is given in Table 1.

Polymerisations with the Catalyst Components of Examples 1–7

Seven polymerisation runs were carried out with each of the solid catalytic components prepared in Examples 1–7 according to the following procedure.

In a 4 l steel autoclave equipped with a mechanical stirrer and jacketed for temperature control, 20 ml of anhydrous hexane, 0.76 g of Al(C$_2$H$_5$)$_3$, 0.335 mmol (0.063 g) of cyclohexyl-methyl-dimethoxysilane (as external donor) and the solid catalytic component were introduced at 30° C. under propylene atmosphere, the molar ratio Al/donor being thus 20. Afterwards, 1200 g of liquid propylene, 1000 Nml of hydrogen were introduced, the temperature was raised to 70° C. and kept at that value for 2 hours.

The polymerisation was then interrupted by depressurising and rapidly cooling the reactor. The obtained polymer obtained was collected, dried in oven for 3 hours and weighed to calculate the yield.

Data relating to the products obtained with each of the catalyst components are given in Table 2.

TABLE 1

| Ex. | Support concentration (g/l TiCl$_4$) | Average residence time of the liquid feed (min) | Mg/DIBP (mol/mol) | Catalyst composition | | | | |
|---|---|---|---|---|---|---|---|---|
| | | | | Mg | Ti | Cl | DIBP | EtOH |
| 1 | 200 | 15 | 7.15 | 16.8 | 3.26 | 59.8 | 17.0 | 0.10 |
| 2 | 200 | 60 | 7.15 | 15.51 | 3.50 | 57.3 | 7.15 | 1.3 |
| 3 | 200 | 15 | 7.15 | 16.8 | 3.6 | 60.9 | 9.4 | 0.50 |
| 4 | 100 | 40 | 12 | 15.5 | 3.3 | 56.1 | 14.3 | 0.53 |
| 5 | 200 | 15 | 7.15 | 17.5 | 4.5 | 63.3 | 7.1 | 0.85 |
| 6 | 100 | 48 | 7.15 | 16.1 | 3.25 | 69.1 | 11.8 | 1.87 |
| 7 | 100 | 48 | 7.15 | 17.4 | 3.7 | 63.4 | 12.9 | 1.4 |

TABLE 2

| Catalyst (Example) | Yield (Kg/g) | Isotactic index | Bulk density (g/ml) | Porosity (V/V %) |
|---|---|---|---|---|
| 1 | 60 | 98.4 | 0.446 | |
| 2 | 37 | 97.3 | 0.421 | |
| 3 | 58 | 97.3 | 0.395 | |
| 4 | 52 | 98.1 | 0.47 | |
| 5 | 47 | 96.7 | 0.397 | |
| 6 | 53 | 96.5 | 0.356 | 28.6 |
| 7 | 41 | 95.5 | 0.38 | 11.3 |

What is claimed is:

1. A process for the preparation of a solid catalyst component for the polymerisation of olefins, said process comprising the steps of:
   continuously feeding a liquid containing a titanium compound having at least one titanium-halogen bond into a vessel containing a suspension of a solid comprising a magnesium halide, and
   continuously discharging liquid from the vessel,
whereby the suspension is maintained under adequate stirring so as to obtain substantial uniformity of concentration throughout the vessel, and wherein a concentration of the solid in the suspension is maintained within the range of between 80 and 300 g/l.

2. The process according to claim 1, whereby a product between an average residence time of the liquid in the vessel and the concentration of the solid in the suspension is maintained below 10,000 min*g/l.

3. The process according to claim 1, wherein an average residence time of the liquid in the vessel is below 50 min.

4. The process according to claim 1, wherein the solid is suspended in a liquid comprising the titanium compound or the titanium compound and a hydrocarbon solvent before continuously feeding the liquid containing the titanium compound.

5. The process according to claim 1, wherein a magnesium compound capable to yield a solid magnesium halide by reaction with the titanium compound is introduced into the vessel and reacted with the titanium compound.

6. The process according to claim 1, wherein the titanium compound is titanium tetrachloride.

7. The process according to claim 1, wherein the solid comprises a magnesium dichloride/ethanol adduct.

8. The process according to claim 1, wherein the liquid continuously fed to the vessel is a liquid organic substance having dielectric constant at 20° C. equal to or higher then 2.

9. The process according to claim 8, wherein the liquid organic substance is toluene or ethylbenzene.

10. The process according to claim 1, wherein an electron donor compound is present in the solid or is contacted with the solid before or during the feeding of the liquid comprising the titanium compound.

11. A process for the homo- or co-polymerisation of α-olefins of formula CH$_2$=CHR, wherein R is hydrogen or an alkyl, cycloalkyl, aryl, arylalkyl or alkylaryl radical with 1 to 12 carbon atoms, said process being carried out in the presence of a solid catalyst component obtained by the process of claim 1 and of an aluminium alkyl compound.

12. The process according to claim 11, wherein propylene or mixtures thereof with other α-olefins are polymerised.

13. The process according to claim 11, wherein the solid catalyst component is contacted with an electron donor before or during the polymerisation.

14. The process according to claim 1, whereby the concentration of the solid in the suspension is maintained within the range of between 100 and 250 g/l and a product between an average residence time of the liquid in the vessel and the concentration of the solid in the suspension is maintained below 5,000 min*g/l.

15. The process according to claim 2, wherein the average residence time of the liquid in the vessel is below 50 min.

16. The process according to claim 14, wherein the average residence time of the liquid in the vessel is below 50 min.

17. The process according to claim 1, wherein an average residence time of the liquid in the vessel is below 30 min.

18. The process according to claim 2, wherein the average residence time of the liquid in the vessel is below 30 min.

19. The process according to claim 14, wherein the average residence time of the liquid in the vessel is below 30 min.

20. A process for the homo- or co-polymerisation of α-olefins of formula CH$_2$=CHR, wherein R is hydrogen or an alkyl, cycloalkyl, aryl, arylalkyl or alkylaryl radical with 1 to 12 carbon atoms, said process being carried out in the presence of a solid catalyst component obtained by the process of claim 2 and of an aluminium alkyl compound.

* * * * *